United States Patent [19]

Schmit

[11] 4,204,097
[45] May 20, 1980

[54] LOCKABLE COVERING APPARATUS FOR TELEPHONE DIALS

[76] Inventor: John W. Schmit, 1858 N. Natoma Ave., Chicago, Ill. 60635

[21] Appl. No.: 924,096

[22] Filed: Jul. 12, 1978

Related U.S. Application Data

[63] Continuation of Ser. No. 772,089, Feb. 25, 1977, abandoned.

[51] Int. Cl.² ............................................. H04M 1/66
[52] U.S. Cl. ................................................ 179/189 D
[58] Field of Search ............... 179/189 D, 189 R, 179, 179/178, 147, 90 A, 90 AD

[56] References Cited

U.S. PATENT DOCUMENTS

| 1,647,833 | 11/1927 | Kwartin | 179/189 R X |
| 3,862,375 | 1/1975 | Thomas | 179/100 R |
| 4,005,279 | 1/1977 | Richter | 179/189 D |

FOREIGN PATENT DOCUMENTS 220684  9/1961  Austria ..................................... 179/179

Primary Examiner—Thomas W. Brown
Attorney, Agent, or Firm—Robert D. Farkas

[57] ABSTRACT

A telephone cover utilizes a unitary cover apparatus adapted to cover portions of the telephone base including the exposed dialing and telephone line selecting devices thereof. An opening in the housing is covered with a slidable element which may be selectively locked to the housing preventing unauthorized access to the dialing and telephone line selecting devices. The slidable cover carries a replaceable note pad and a holder for a writing implement.

5 Claims, 2 Drawing Figures

LOCKABLE COVERING APPARATUS FOR TELEPHONE DIALS

This application is a continuation of prior U.S. application Ser. No. 772,089 filed on Feb. 25, 1977, now abandoned.

BACKGROUND OF THE INVENTION

1. The Field of the Invention

This invention relates to telephone covers and more particularly to that class of cover which prevents access to the telephone dialing apparatus.

2. Description of the Prior Art

The prior art abounds with telephone covers and locks. U.S. Pat. No. 1,620,628 issued on Mar. 15, 1927 to E. C. Beth teaches a telephone locking device which utilizes a housing surrounding the base portion of a pedestal type telephone, having a hingable cover which may be locked covering an opening through which the telephone dial may be accessed. This device substantially covers, in box-like fashion, the pedestal-like base and the telephone dial affixed thereto whilst permitting the telephone column, carrying the microphone and receiver portions, to extend through an opening therein so as to be free to be operated to receive incoming calls.

U.S. Pat. No. 3,495,050 issued on Feb. 10, 1970 to P. D. Bart discloses a partial cover for a telephone base having arms that are clamped to the telephone base when a locking mechanism is positioned in a locked position, thereby preventing the unauthorized removal of the cover section so as to expose the dialing apparatus affixed to the telephone base. After unlocking the lock, the housing may be removed from the base, exposing the dialing apparatus for unlimited use.

Both of the aforementioned patents describe apparatus differing from the present invention by failing to provide a telephone dialing and line selecting apparatus cover which is functional in restricting the unauthorized use of the telephone apparatus whilst providing a convenient desk-like surface, attached to the telephone base, suitable for the storage and recording of information on the implements carried thereby.

SUMMARY OF THE INVENTION

A primary object of the present inventon is to provide a telephone apparatus cover which prevents the unauthorized use of the dialing apparatus of the telephone whilst permitting incoming calls.

Another object of the present invention is to provide a slidable cover which when slidably displaced provides convenient access to the telephone dialing and line selecting apparatus portions of the telephone.

Still another object of the present invention is to provide a slidable cover which serves as a convenient table for the use of a notepad and a writing implement conveniently secured thereto.

Yet another object of the present invention is to provide a phone cover suitable for use on telephone bases having rotary dials or pushbutton dialing equipment.

A further object of the present invention is to provide a phone cover in accordance with the preceding objects which is simple in construction, relatively inexpensive and effective for its particular purposes.

The present invention utilizes a one piece housing having external surfaces substantially conforming to portions of the external surfaces of a telephone base, including front, rear, and side walls, having two major openings therein thereby minimizing the increasing of the bulk of the assembled devices. The housing is secured to the telephone base in a neat fashion by utilizing arms whose free ends are inserted between the telephone base cover and the telephone base plate at a location adjacent the lowermost major opening. The hand held instrument portion of the telephone device is unconstrained and may be lifted from and replaced into the cradle when it is stored. A slidable cover, having a note pad and a writing implement secured thereto, covers the uppermost major opening in the housing, when slidably closed, preventing free access to the telephone dialing and telephone line selecting apparatus of the instrument. The cover may be locked into the covered position by the operation of a key operated lock carried by the cover. The composite apparatus, when fabricated from inexpensive plastic materials, may be keyed to the color of the telephone instrument, thereby providing a neat appearing and functional housing for the telephone apparatus.

These objects, as well as other objects of the present invention, will become more readily apparent after reading the following description of the accompanying drawings.

DESCRIPTION OF THE PREFERRED EMBODIMENT

Figure 1:
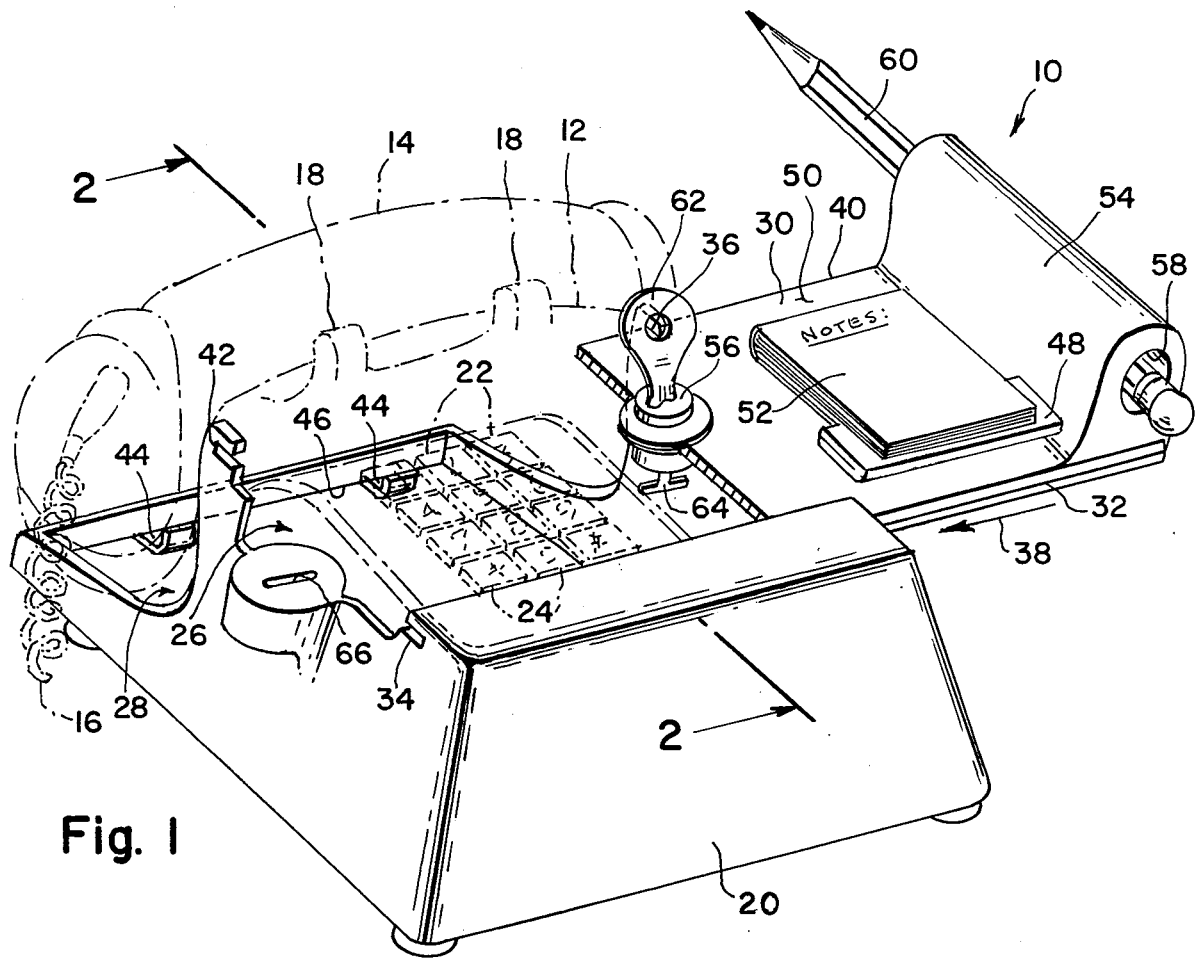
FIG. 1 is a perspective view of the present invention.

The structure and method of fabrication of the present invention is a applicable to a housing adapted to partially encase a telephone base including portions of the marginal edges of the base and portions of the base carrying the telephone dial apparatus and, if so provided, the telephone line selecting apparatus. The housing may be defined as having front, rear, and side walls, which include two major openings therein. Four arms are secured to the marginal edges of the housing which are adapted to reside circumscribing the lowermost portions of the telephone base at a location adjacent the lowermost major opening. Each arm is provided with an inwardly and upwardly turned end which is inserted intermediate the telephone base's integral cover and the telephone base's base plate. The uppermost major opening in the housing extends over that portion of the telephone base carrying the dialing and line selecting apparatus thereof. The housing may be disengaged from the telephone base to pass through a notch-like portion of the uppermost opening in the housing, which is contiguous with another portion of such opening, through which the hand held instrument and the storage cradle therefor passes.

A substantially flat cover plate is slidably engaged with the cover having one marginal edge thereof slidable within a marginal edge of the telephone dial apparatus access notch-like portion of the uppermost opening. Another marginal edge of the cover selectively engages a pair of notches, disposed in spaced apart relationship, affixed to the housing along a line separating the notch-like portion of the uppermost opening and the other portion of the uppermost opening, through which the hand held instrument cradle passes. When the cover is disposed closing the notch-like portion of the uppermost opening, the telephone base may not be withdrawn from the housing encircling it.

The cover carries a key operated lock having a projection rotatably operated by the lock. The projection is adapted to engage a slot in the housing such that the cover may be locked into position covering the notch-like portion of the uppermost opening, thereby preventing free access to the telephone dialing and line selecting apparatus. The cover may be slidably manually disposed uncovering the notch-like portion of the uppermost opening and, if desired, restrained from total disengagement from the housing when the projection contacts an interior surface of the wall of the housing adjacent thereto. A note pad, either in blank form or carrying suitable indicia, is removably secured to the uppermost surface of the cover by having the lowermost stiffened cover sheet thereof inserted into a U-shaped clip fixedly secured to the uppermost surface of the cover. The marginal edge carrying the key operated lock, is provided with an elongated rounded protrusion, serving as a handle and as a depository for a writing implement, such as a pencil, residing partially within the passageway of an elongated hole. The lowermost major opening is adjacent the bottom of the telephone base.

Now referring to the Figures, and more particularly to the embodiment illustrated in FIG. 1 showing the present invention 10 shown partially covering a telephone base 12. A hand held portion 14 of the telephone instrument and its electrical operating cord 16 and the cradle elements 18, in which instrument 14 is stored, are uncovered by a housing 20 which covers selective portions of telephone base 12. Pushbutton dialing apparatus operating buttons 22 and pushbutton telephone line selecting apparatus buttons 24 are visible through a notch-like portion 26 of an uppermost opening 26. Another portion 28 of such opening is contiguous with portion 26 and exposes cradle portions 18 and hand held portion 14 of telephone base 12 for free unrestricted use. Cover plate 30 is shown having marginal edge 32 thereof slidably engaged within elongated notch 34 and slidably engaged within shortened notch 36. When cover plate 30 is manually displaced in the direction of arrow 38, a portion of marginal edge 40 thereof engages shortened slot 42. When in this position, cover plate 30 prevents free access to buttons 22 and 24.

Arms 44 extend inwardly and upwardly from housing 20 from the lowermost marginal edge 46 thereof.

U-shaped clip 48 is fixedly secured to the uppermost surface 50 of cover 30 and is utilized to clampingly retain the lowermost sheets of notepad 52 to surface 50. Elongated protrusion 54 is disposed adjacent a marginal edge of cover 30 opposite to a key operated lock 56, carried by cover plate 30. Opening 58 in protrusion 54 provides a storage passageway for portions of pencil 60. Key 62 operates lock 56 and rotatably operates projection 64 which may be displaced in a downward direction by depressing key 62 downwardly. When cover 30 is moved in the direction of arrow 38, projection 64 may be located above slot 66. A downward force causes projection 64 to enter slot 66 and upon the rotation of key 62, causes projection 64 to become lockingly engaged within the cavity, not shown, below slot 66, thereby maintaining cover 30 in a locked position concealing buttons 22 and 24 from view.

Figure 2:
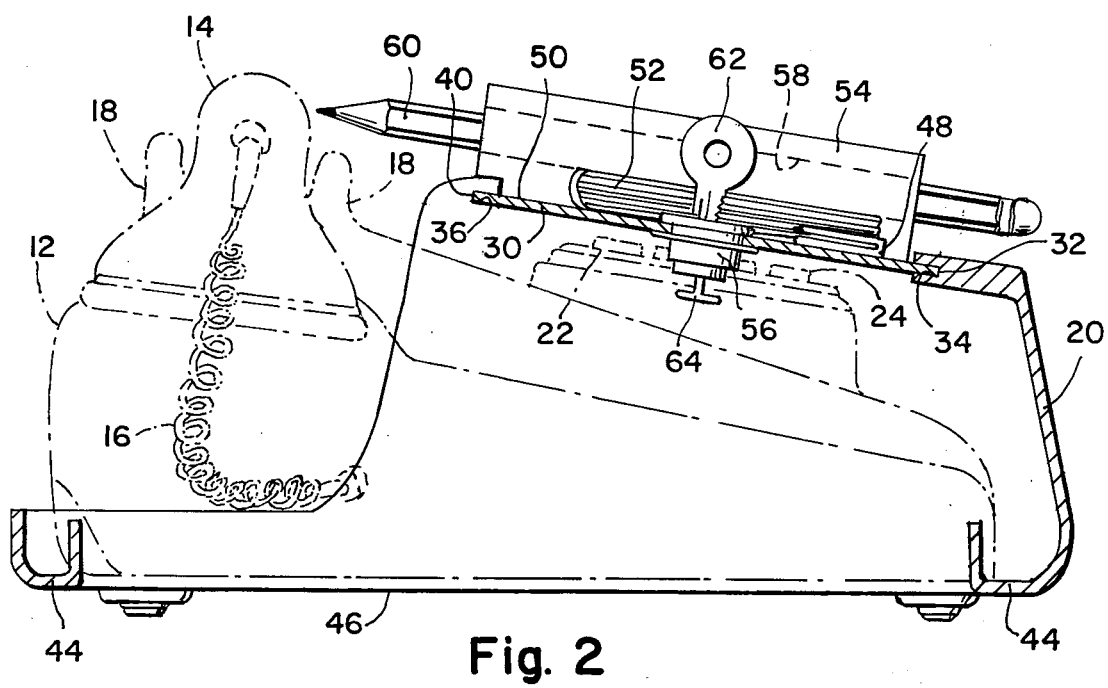
FIG. 2 is a side elevation cross-sectional view taken along line 2—2 viewed in the direction of arrow 2—2 as shown in FIG. 1.

FIG. 2 shows housing 20 covering portions of telephone instrument 12 and having arms 44 extend upwardly into cavities within telephone instrument 12.

One of the advantages of the present invention is a telephone apparatus cover which prevents the unauthorized use of the dialing apparatus of the telephone whilst permitting incoming calls.

Another advantage of the present invention is a slidable cover which when slidably displaced provides convenient access to the telephone dialing and line selecting apparatus portions of the telephone.

Still another advantage of the present invention is a slidable cover which serves as a convenient table for the use of a notepad and writing implement conveniently secured thereto.

Yet another advantage of the present invention is a phone cover suitable for use on telephone bases having rotary dials or pushbutton dialing equipment.

A further advantage of the present invention is a phone cover in accordance with the preceding objects which is simple in construction, relatively inexpensive and effective for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A telephone dial shielding device for selectively permitting or preventing access to the dialing area of a telephone base comprising a housing, said housing including a front wall and a rear wall and side walls, said housing having a first opening and a second opening therein, said housing covering portions of a base of a telephone, said first opening having a first portion and a second portion, the hand held portion of the telephone being disposed outwardly of said housing, said first portion of said first opening being located adjacent the receptacle portions of said telephone base in which said hand held portion thereof resides when stored, said second opening being located adjacent the underside of said base, said second portion of said first opening being located adjacent the dialing area of said telephone base, said first portion of said first opening and said second portion of said first opening communicating with each other, a cover, said cover movable slidably relative to said housing, and a lock, said lock releasably lockingly engaging said cover to said housing, wherein said front wall and said side walls and said rear wall and said cover are configured to enclose portions of said telephone base in confining engagement therewithin when said cover is locked to said housing, said second opening being configured to provide access to the underside of said base when said base is engaged within said housing.

2. The apparatus as claimed in claim 1 further comprising
means to removably secure a pad of paper to said cover.

3. The apparatus as claimed in claim 1 further comprising
means to removably secure an elongated writing implement to said cover.

4. The apparatus as claimed in claim 1 further comprising at least one arm, one end of said arm fixedly secured to said housing, the other end of said arm being disposed confined within a cavity in said telephone base passing through said underside of said base.

5. The apparatus as claimed in claim 1 wherein said second portion of said first opening is adjacent to and covers pushbutton apparatus of the telephone utilized to select one of a plurality of telephone lines operating said telephone.

* * * * *